United States Patent
Rossi et al.

(10) Patent No.: US 11,912,025 B2
(45) Date of Patent: Feb. 27, 2024

(54) ISSUE DETERMINATIONS RESPONSIVE TO MEASUREMENTS

(71) Applicant: Hewlett-Packard Development Company, L.P., Spring, TX (US)

(72) Inventors: John Rossi, Vancouver, WA (US); Erik D. Ness, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 301 days.

(21) Appl. No.: 16/972,133

(22) PCT Filed: Feb. 6, 2019

(86) PCT No.: PCT/US2019/016735
§ 371 (c)(1),
(2) Date: Dec. 4, 2020

(87) PCT Pub. No.: WO2020/162895
PCT Pub. Date: Aug. 13, 2020

(65) Prior Publication Data
US 2021/0354447 A1 Nov. 18, 2021

(51) Int. Cl.
*B41J 2/045* (2006.01)

(52) U.S. Cl.
CPC ........... *B41J 2/0458* (2013.01); *B41J 2/0451* (2013.01); *B41J 2/0452* (2013.01); *B41J 2/0457* (2013.01); *B41J 2/04555* (2013.01)

(58) Field of Classification Search
CPC .... B41J 2/0451; B41J 2/0457; B41J 2/04543; B41J 2/04581; B41J 2/0458; B22F 12/53; B29C 64/209
See application file for complete search history.

(56) References Cited

U.S. PATENT DOCUMENTS

| 4,680,780 A | 7/1987 | Agoston et al. |
| 4,910,528 A | 3/1990 | Firl et al. |
| 5,012,494 A | 4/1991 | Lai et al. |
| 5,422,662 A | 6/1995 | Fukushima et al. |
| 5,699,515 A | 12/1997 | Berkema |

(Continued)

FOREIGN PATENT DOCUMENTS

| CN | 102176199 A | 9/2011 |
| CN | 105832381 A | 8/2016 |

(Continued)

OTHER PUBLICATIONS

Hewlett-Packard Development Company, L.P., Int. Appl. No. PCT/US2019/016734 entitled Data Packets Comprising Random Numbers for Controlling Fluid Dispensing Devices filed Feb. 6, 2019 (33 pages).

(Continued)

*Primary Examiner* — Kristal Feggins
(74) *Attorney, Agent, or Firm* — Brooks, Cameron & Huebsch, PLLC (57) ABSTRACT

In some examples, a controller includes an interface to receive an indication based on an electrical current through a device, and a processor to send control data to the device to operate the device, detect a measurement based on the indication that is responsive to an operation of the device according to the control data, and determine whether an issue exists in the device responsive to determining whether the measurement satisfies an expected property based on the control data.

15 Claims, 5 Drawing Sheets

(56) References Cited

U.S. PATENT DOCUMENTS

| | | |
|---|---|---|
| 5,760,797 A | 6/1998 | Koizumi |
| 5,838,749 A | 11/1998 | Casper et al. |
| 5,850,422 A | 12/1998 | Chen |
| 6,102,510 A | 8/2000 | Kikuta |
| 6,128,098 A | 10/2000 | Kamada et al. |
| 6,168,252 B1 | 1/2001 | Yaji |
| 6,266,799 B1 | 7/2001 | Lee et al. |
| 6,808,243 B1 | 10/2004 | Markham et al. |
| 7,159,959 B2 | 1/2007 | Schremp |
| 7,419,236 B2 | 9/2008 | Masuda |
| 7,738,137 B2 | 6/2010 | Graf et al. |
| 7,866,778 B2 | 1/2011 | Silverbrook et al. |
| 8,556,364 B2 | 10/2013 | Hoisington et al. |
| 8,777,364 B2 | 7/2014 | Carrobe et al. |
| 9,415,585 B1 | 8/2016 | Goyen et al. |
| 9,597,894 B2 | 3/2017 | Buxton et al. |
| 9,676,180 B2 | 6/2017 | Gracia Verdugo et al. |
| 9,701,116 B2 | 7/2017 | Van Brocklin et al. |
| 9,738,092 B2 | 8/2017 | Takahashi et al. |
| 9,776,395 B2 | 10/2017 | Anderson et al. |
| 2003/0142159 A1 | 7/2003 | Askeland |
| 2005/0105591 A1 | 5/2005 | Egan |
| 2005/0253894 A1 | 11/2005 | Smektala |
| 2006/0071964 A1 | 4/2006 | Oku |
| 2006/0152572 A1 | 7/2006 | Kasai |
| 2006/0159502 A1 | 7/2006 | Saquib |
| 2007/0064083 A1 | 3/2007 | Saquib et al. |
| 2008/0136859 A1 | 6/2008 | Kim et al. |
| 2009/0175310 A1 | 7/2009 | Saquib et al. |
| 2010/0124329 A1 | 5/2010 | Lyman |
| 2010/0322249 A1 | 12/2010 | Thathapudi et al. |
| 2012/0025845 A1 | 2/2012 | Carrobe et al. |
| 2012/0236056 A1 | 9/2012 | Ito |
| 2013/0321507 A1 | 12/2013 | Mardilovich et al. |
| 2016/0221335 A1 | 8/2016 | Karasawa |
| 2016/0236466 A1 | 8/2016 | Takahashi et al. |
| 2017/0096002 A1 | 4/2017 | Koerner et al. |
| 2017/0348968 A1 | 12/2017 | Anderson et al. |
| 2018/0326728 A1 | 11/2018 | Clark et al. |
| 2018/0370227 A1 | 12/2018 | Hayashi et al. |

FOREIGN PATENT DOCUMENTS

| | | |
|---|---|---|
| CN | 108367568 A | 8/2018 |
| CN | 108513550 A | 9/2018 |
| CN | 109070616 A | 12/2018 |
| EP | 0972374 | 1/2000 |
| JP | H02208052 A | 8/1990 |
| JP | 2002-127405 A | 5/2002 |
| JP | 2008137237 A | 6/2008 |
| KR | 20080006823 | 1/2008 |
| TW | 201637880 A | 11/2016 |
| WO | 99/40702 A1 | 8/1999 |
| WO | WO2013158105 A1 | 10/2013 |

OTHER PUBLICATIONS

What is a Kelvin connection and when should it be used? Dated on or before Jan. 2019 (2 pages).

Wikipedia, Four-terminal sensing last edited Sep. 16, 2018 (3 pages).

ISSUE DETERMINATIONS RESPONSIVE TO MEASUREMENTS

BACKGROUND

A fluid dispensing system can dispense fluid towards a target. In some examples, a fluid dispensing system can include a printing system, such as a two-dimensional (2D) printing system or a three-dimensional (3D) printing system. A printing system can include printhead devices that include fluidic actuators to cause dispensing of printing fluids.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A fluid dispensing device can include fluidic actuators that when activated cause dispensing (e.g., ejection or other flow) of a fluid. For example, the dispensing of the fluid can include ejection of fluid droplets by activated fluidic actuators from respective nozzles of the fluid dispensing device. In other examples, an activated fluidic actuator (such as a pump) can cause fluid to flow through a fluid conduit or fluid chamber. Activating a fluidic actuator to dispense fluid can thus refer to activating the fluidic actuator to eject fluid from a nozzle or activating the fluidic actuator to cause a flow of fluid through a flow structure, such as a flow conduit, a fluid chamber, and so forth.

Activating a fluidic actuator can also be referred to as firing the fluidic actuator. In some examples, the fluidic actuators include thermal-based fluidic actuators including heating elements, such as resistive heaters. When a heating element is activated, the heating element produces heat that can cause vaporization of a fluid to cause nucleation of a vapor bubble (e.g., a steam bubble) proximate the thermal-based fluidic actuator that in turn causes dispensing of a quantity of fluid, such as ejection from an orifice of a nozzle or flow through a fluid conduit or fluid chamber. In other examples, a fluidic actuator may be a piezoelectric membrane based fluidic actuator that when activated applies a mechanical force to dispense a quantity of fluid.

In examples where a fluid dispensing device includes nozzles, each nozzle includes a fluid chamber, also referred to as a firing chamber. In addition, a nozzle can include an orifice through which fluid is dispensed, a fluidic actuator, and a sensor. Each fluid chamber provides the fluid to be dispensed by the respective nozzle.

Generally, a fluidic actuator can be an ejecting-type fluidic actuator to cause ejection of a fluid, such as through an orifice of a nozzle, or a non-ejecting-type fluidic actuator to cause flow of a fluid.

A fluid dispensing device is susceptible to various issues, such as contamination by particles in fluids that can cause certain electrical components in the fluid dispensing device to not function in a target manner. In other examples, the fluid dispensing device can malfunction due to electrical shorts or other electrical anomalies that can cause faults in the operation of the fluid dispensing device. In further examples, the fluid dispensing device may be operated in an extreme environmental condition (e.g., hot temperature, high humidity, cold temperature, etc.) that can cause the fluid dispensing device to deviate from operating within a target range, or can damage the components of the fluid dispensing device.

In some examples, detection techniques or mechanisms to detect issues of fluid dispensing devices are performed outside of a normal fluid dispensing operation of a fluid dispensing device. For example, the detection techniques or mechanisms may perform issue detection during power up of the fluid dispensing device, during servicing of the fluid dispensing device, after insertion of the fluid dispensing device in a system, or during any other time when the fluid dispensing device is not actively dispensing fluid to perform a requested operation (e.g., printing onto a target).

With such detection techniques or mechanisms, issues that occur during fluid dispensing operations of a fluid dispensing device may not be detectable until after some amount of time has passed, which may delay when an issue is detected and addressed, and can cause sub-optimal fluid dispensing operations.

In accordance with some implementations of the present disclosure, issue detection for a device can be performed during a normal fluid dispensing operation of the device. As used here, a device can refer to a fluid dispensing device, such as a printhead, a fluidic die, or any other device in which fluid can be controlled to flow between different points. In other examples, a device can refer to another type of device, such as a servo control device, a switch device, and so forth.

In some examples, a controller sends control data to the device to operate the device, and detects a measurement of a "measurable event" during an operation of the device according to the control data. The "measurable event" may correspond to control data that exhibits a specific pattern (e.g., a pattern in which first control data that does not activate any nozzle is followed by second control data that activates all nozzles of the fluid dispensing device). The controller determines whether an issue exists in the device responsive to determining whether the measurement satisfies an expected property based on the control data.

Figure 1:
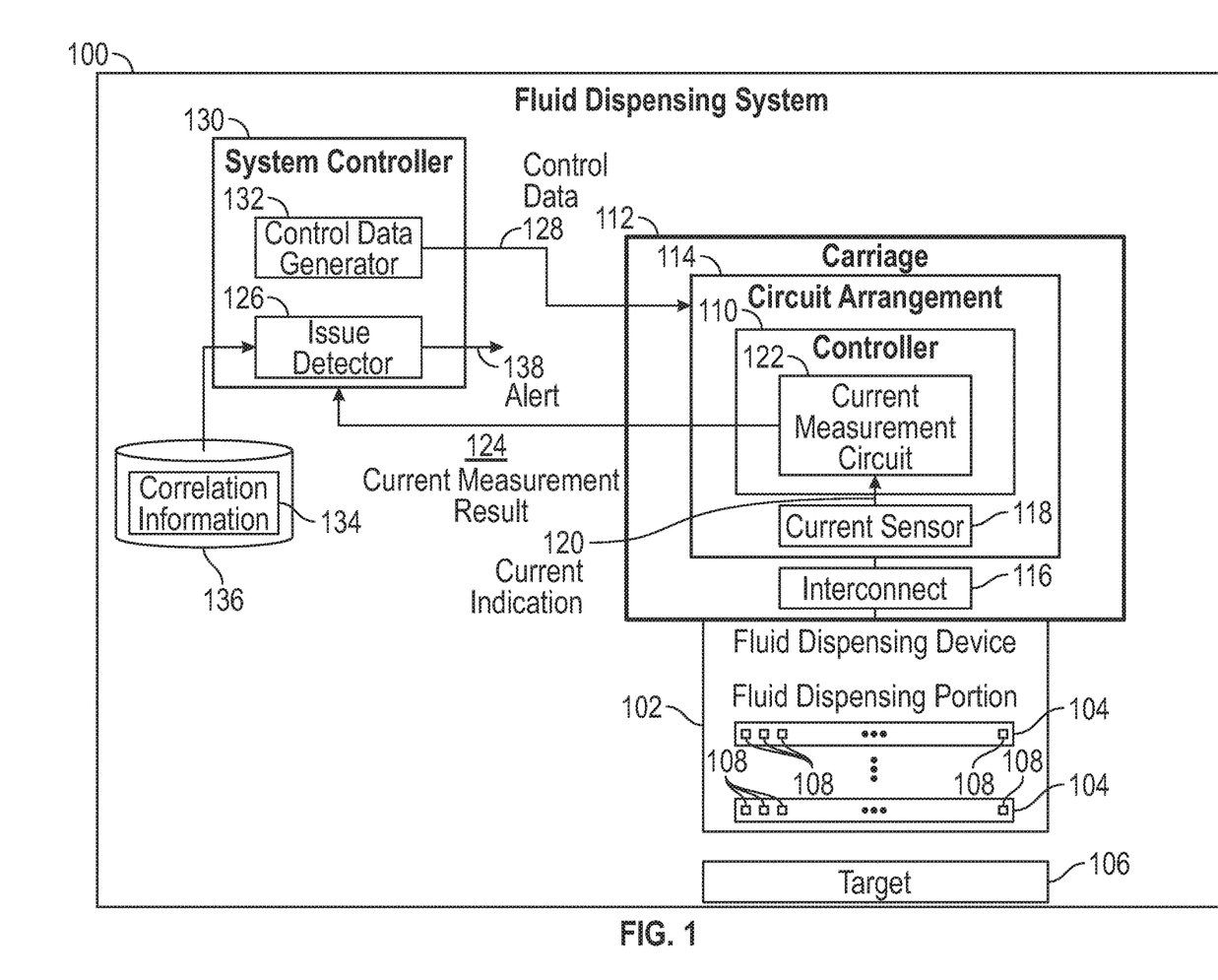
FIG. 1 is a block diagram of a fluid dispensing system according to some examples.

FIG. 1 is a block diagram of a fluid dispensing system 100, according to some examples. The fluid dispending system 100 can be a printing system, such as a 2D printing system or a 3D printing system. In other examples, the fluid dispending system 100 can be a different type of fluid dispensing system. Examples of other types of fluid dispensing systems include those used in fluid sensing systems, medical systems, vehicles, fluid flow control systems, and so forth.

The fluid dispensing system 100 includes a fluid dispensing device 102 that includes a fluid dispensing portion 104 (or multiple fluid dispensing portions 104) for dispensing fluid towards a target 106. In some examples, a fluid dispensing portion 104 can be in the form of a fluidic die. A "die" refers to an assembly where various layers are formed onto a substrate to fabricate circuitry, fluid chambers, and fluid conduits. Multiple fluidic dies can be mounted or attached to a support structure. In other examples, a fluid dispensing portion 104 can include a fluidic die sliver, which can be formed of a thin substrate (e.g., having a thickness on the order of 650 micrometers ($\mu$m) or less) with a ratio of length to width (L/W) of at least three, for example. A die sliver can have other dimensions in other examples. Multiple fluidic die slivers can be molded into a monolithic molding structure, for example.

In a 2D printing system, the fluid dispensing device 102 includes a printhead that ejects printing fluid (e.g., ink) onto a print medium, such as a paper medium, a plastic medium, and so forth.

In a 3D printing system, the fluid dispensing device 102 includes a printhead that can eject any of various different liquid agents onto a print target, where the liquid agents can include any or some combination of the following: ink, an agent used to fuse or coalesce powders of a layer of build material, an agent to detail a layer of build material (such as by defining edges or shapes of the layer of build material), and so forth. In a 3D printing system, a 3D target is built by depositing successive layers of build material onto a build platform of the 3D printing system. Each layer of build material can be processed using the printing fluid from a printhead to form the desired shape, texture, and/or other characteristic of the layer of build material.

A fluid dispensing portion 104 includes an array of fluidic actuators 108. The array of fluidic actuators 108 can include a column of fluidic actuators, or multiple columns of fluidic actuators. The fluidic actuators 108 can be organized into multiple primitives, where each primitive includes a specified number of fluidic actuators. The fluidic actuators 108 can be part of nozzles or can be associated with other types of flow structures, such as fluid conduits, fluid chambers, and so forth. Each fluidic actuator is selected by a respective different address provided by a controller (e.g., a controller 110 or a different controller) in the fluid dispensing system 100.

As used here, a "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit. Note that a "controller" can also refer to a collection of discrete chips or logic elements, such as those implementing timers, counters, state machines, latches, buffers, and so forth.

In examples according to FIG. 1, the fluid dispensing device 102 is removably attached to a carriage 112 of the fluid dispensing system 100. The carriage 112 can be moveable relative to the target 106 onto which a fluid is to be dispensed. In other examples, the carriage 112 and the target 106 may be fixed in position relative to one another.

In examples according to FIG. 1, a circuit arrangement 114 including the controller 110 is mounted to the carriage 112. In some examples, the circuit arrangement 114 includes a printed circuit arrangement (PCA). A PCA refers to an arrangement that includes a circuit board on which an electronic component (or multiple electronic components) can be mounted.

The circuit arrangement 114 is connected by an electrical interconnect 116 to the fluid dispensing device 102. The electrical interconnect 116 can be in the form of an electrical cable, a flex cable, a connector, and so forth. The electrical interconnect 116 is used to carry power and signals between the circuit arrangement 114 and the fluid dispensing device 102. More specifically, the electrical interconnect 116 can include power lines (formed of electrical wires, traces, contact pads, etc.) that carry power provided by a power source (not shown) to the fluid dispensing device 102. The power source is electrically coupled to the circuit arrangement 114.

An electrical current sensor 118 is provided as part of the circuit arrangement 114. The electrical current sensor 118 can be used to detect an amount of electrical current that flows through a power line connected to the fluid dispensing device 102. For example, the power line can provide a power voltage. The electrical current sensor outputs a current indication 120 to the controller 110. The current indication 120 in some examples can be in the form of an electrical voltage value. In other examples, the current indication 120 may be expressed as a different value, such as an electrical current value, an electrical impedance value, and so forth.

The controller 110 includes a current measurement circuit 122 that receives the current indication 120. In examples according to FIG. 1, the current measurement circuit 122 can be implemented as part of the hardware processing circuit of the controller 110. In alternative examples, the current measurement circuit 122 can be separate from the controller 110.

The current measurement circuit 122 is able to determine a level of the electrical current, such as whether or not the electrical current exceeds or does not exceed a threshold. The current measurement circuit 122 outputs a current measurement result 124 that is based on the current indication 120. For example, the current measurement result 124 can provide different indications based on whether the electrical current represented by the current indication 120 exceeds the threshold. If the electrical current represented by the current indication 120 exceeds the threshold, the current measurement result 124 includes a first value (e.g., a first binary value such as 0 or 1). If the electrical current represented by the current indication 120 does not exceed the threshold, the current measurement result 124 includes a different second value (e.g., a second binary value such as 1 or 0).

In other examples, the current measurement result 124 can include a value (e.g., a numeric value) representing the measured electrical current as represented by the current indication 120. More generally, the current measurement result 124 can include information to indicate various characteristics of the electrical current measured by the electrical current sensor 118, or more generally, the electrical current that has passed through a portion of the fluid dispensing device 102.

In examples according to FIG. 1, the current measurement result 124 is provided to a system controller 130 of the fluid dispensing system 100. The system controller 130 can perform overall fluid dispensing operations of the fluid dispensing system 100, including activation of fluidic actuators 108 of the fluid dispensing device 102. For example, if the fluid dispensing system 100 is a printing system, the system controller 130 can receive an input representation of the image to be printed, and provide control signals to control the fluid dispensing device 102 to print the image onto the target 106.

Although FIG. 1 shows two separate controllers 130 and 110, it is noted that in other examples there can be just a single controller. As used here, the term "controller" can refer to either one or both of the controllers 110 and 130.

The system controller 130 includes an issue detector 126. The issue detector 126 can be implemented as part of the hardware processing circuit of the system controller 130, or it can be implemented as machine-readable instructions executable by the system controller 130. In further examples, the issue detector 126 can be part of the controller 110.

The issue detector 126 is able to determine whether an issue exists in the fluid dispensing device 102 based on the current measurement result 124 and based on control data 128 that is issued by a control data generator 132 of the system controller 130. The control data generator 132 can be implemented as part of the hardware processing circuit of the system controller 130, or alternatively, as machine-readable instructions executable by the system controller 130.

The control data 128 generated by the control data generator 130 may include fire data and timing signals. In some examples, fire data (also referred to as "primitive data" in examples where fluidic actuators are arranged in primitives) is provided to control activation or non-activation of fluidic actuators 108 (such as in each primitive) of a fluid dispensing portion 104.

In examples where fluidic actuators 108 are grouped into primitives, the primitive data can include corresponding bits to represent which of the fluidic actuators of a primitive is (are) activated when a fire pulse (generated by the system controller 130) is delivered to the primitive. A fire pulse corresponds to a fire signal being activated.

The issue detector 126 is able to observe the control data 128 (and more specifically, the fire data) and determine a target threshold against which a measured electrical current should be compared. For example, the issue detector 126 is able to use correlation information 134 (which can be stored in a storage medium 136) that correlates a fluidic actuator activation pattern to an expected electrical current. The fluidic actuator activation pattern is an example of the "measurable event" discussed above that triggers a determination performed by the system controller 130 of whether or not an issue exists with the fluid dispensing device 102. The fluidic actuator activation pattern includes a specific pattern of the fire data, such as a pattern in which first control data 128 that does not activate any nozzle is followed by second control data 128 that activates all nozzles of the fluid dispensing device. In other examples, other fluidic actuator activation patterns are used as measurable events to trigger the issue determination performed by the issue detector 126.

The issue detector 126 is able to determine based on the correlation information 134 what the expected electrical current should be. In some examples, the issue detector 126 can use the correlation information 134 to set a target threshold against which the measured electrical current (as measured by the electrical current sensor 118 and detected by the current measurement circuit 122) is compared by the current measurement circuit 122. Alternatively, in examples where the current measurement result 124 from the current measurement circuit 122 is a value representing the measured electrical current, the issue detector 126 can compare the measured electrical current to the target threshold based on the correlation information 134.

More generally, issue detector 126 can determine whether an issue exists in the fluid dispensing device 102 responsive to determining whether a current measurement satisfies an expected property based on the control data, such as whether a transition of the measurement current falls within a target time window (depicted in FIG. 2 and explained further below).

If the issue detector 126 determines based on the current measurement result 124 that an issue is present in the fluid dispensing device 102, the issue detector 126 generates an alert 138. The alert 138 can be transmitted to a user or other entity (e.g., a machine or program), or alternatively, the alert 138 can be used to stop or adjust an operation of the fluid dispensing system 100, such as to prevent any further fluid dispensing operation while the issue is present.

The foregoing refers to an example in which the issue detector 126 determines whether an issue exists based on one current measurement result 124. In other examples, the issue detector 126 can make the issue determination based on multiple current measurement results 124 received at different times.

For example, the issue detector 126 is able to track measured electrical currents (as represented by the current measurement result 124) measured in respective different activation intervals in which different control data are provided (e.g., a first control data in a first activation interval that activates no fluidic actuators followed by a second control data in a second activation interval that activates all fluidic actuators). An activation interval is also referred to as a fire pulse group (FPG), and indicates a time interval during which the control data 128 causes controlled activation of selected fluidic actuators 108. Thus, for the first control data 128 in the first activation interval, the issue detector 126 logs a first measurement result 124. For the second control data 128 in the second activation interval, the issue detector 126 logs a second current measurement result 124. This process can continue for a number of current measurement results (that collectively are part of a measurable event) to be tracked by the issue detector 126. Once a target number of current measurement results 124 are collected, the issue detector 126 can determine a timing of variations in the measured electrical current for the respective measureable events (e.g., determine whether a transition of the measured electrical current between different states falls within an expected time window). The timing of variations in the measured electrical current can be used to determine whether or not an issue is present in the fluid dispensing device 102.

Figure 2:
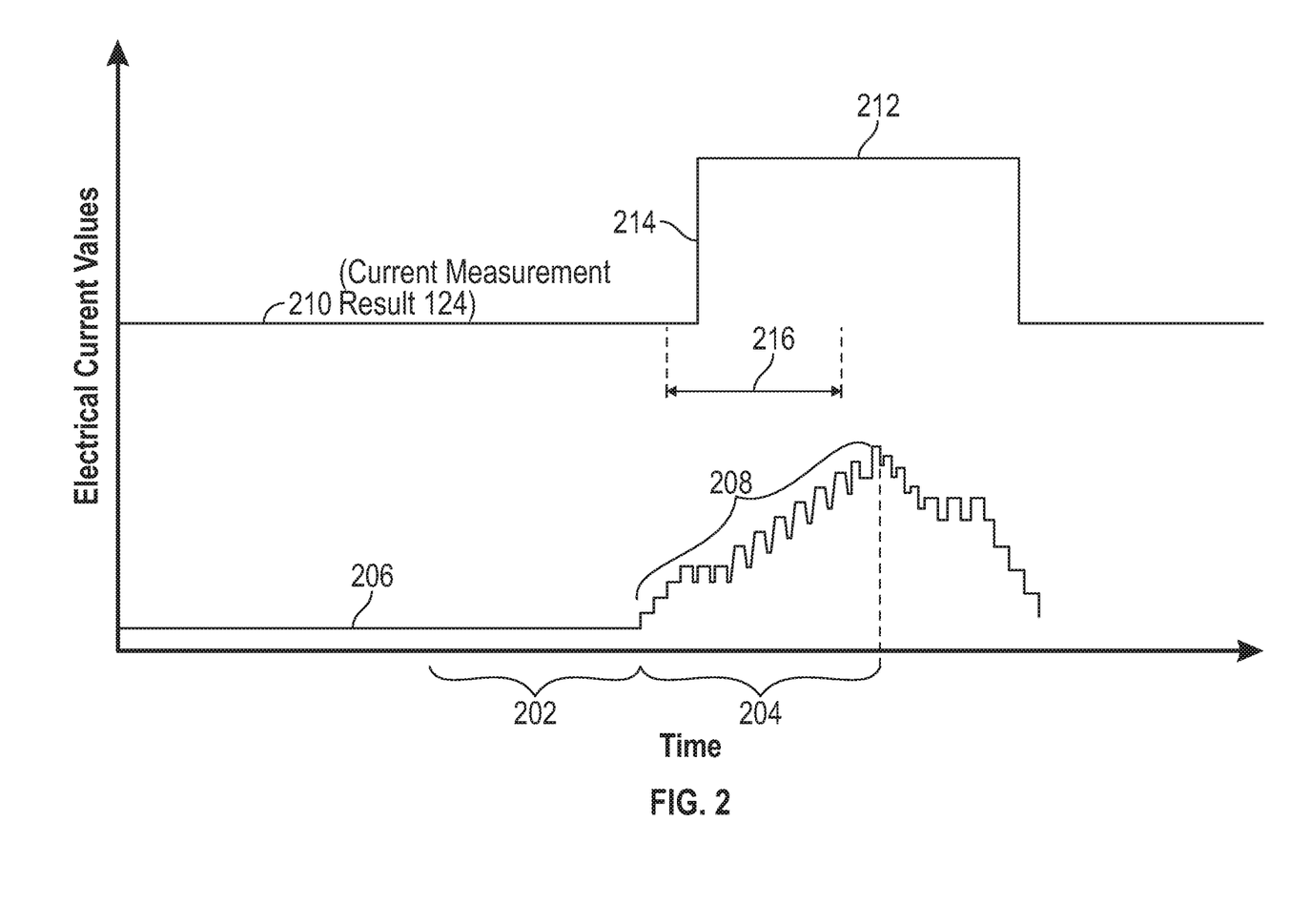
FIG. 2 is a timing diagram of a measured electrical current and a current measurement result, acquired according to some examples.

FIG. 2 is a timing diagram that shows an example where current measurement results are collected for two activation intervals 202 and 204. The horizontal axis of the chart of FIG. 2 represents time, and the vertical axis represents electrical current values (the measured electrical current produced by the current sensor 118 and the current measurement result 124 from the current measurement circuit 122, for example). In the first activation interval 202, it is assumed that the collection of primitive data has elected to maintain all fluidic actuators off (this is a first measurable event). As a result, the measured electrical current (represented by curve 206) remains at zero or some low value during the activation interval 202. However, in the second activation interval 204 following the first activation interval 202, the collection of primitive data generated by the control data generator 132 activates all primitives (this is a second measurable event). As a result, in the second activation interval 204, the measured electrical current as represented by the curve 206 increases in an incremental manner (as represented by portion 208 of the curve 206). The reason that the electrical current increases in an incremental manner is that delays are used to cause fluidic actuators 208 of different primitives to activate at different times in response to the same fire pulse, to avoid a rapidly rising large current spike.

FIG. 2 also shows a curve 210 that represents the current measurement result 124 of FIG. 1. In the first activation interval 202 and in a part of the second activation interval 204, the current measurement result 124 has a first value (e.g., 0) to indicate that the measured electrical current is below the target threshold. However, once the rising measured electrical current during the second activation interval 204 rises above the target threshold, the current measurement result 124 switches to a second value, as represented by 212 (e.g. 1).

In some examples, the issue detector 126 determines if a transition edge 214 between the first value and the second value of the current measurement results 124 occur within a target time window represented by 216. If the transition edge 214 occurred within the target time window 216, then that is an indication that no issue is detected for the fluid dispensing device 102. However, if the transition edge 214 falls outside the target time window 216, then the issue detector 126 can generate the alert 134 indicating the presence of the detected issue.

Figure 3:
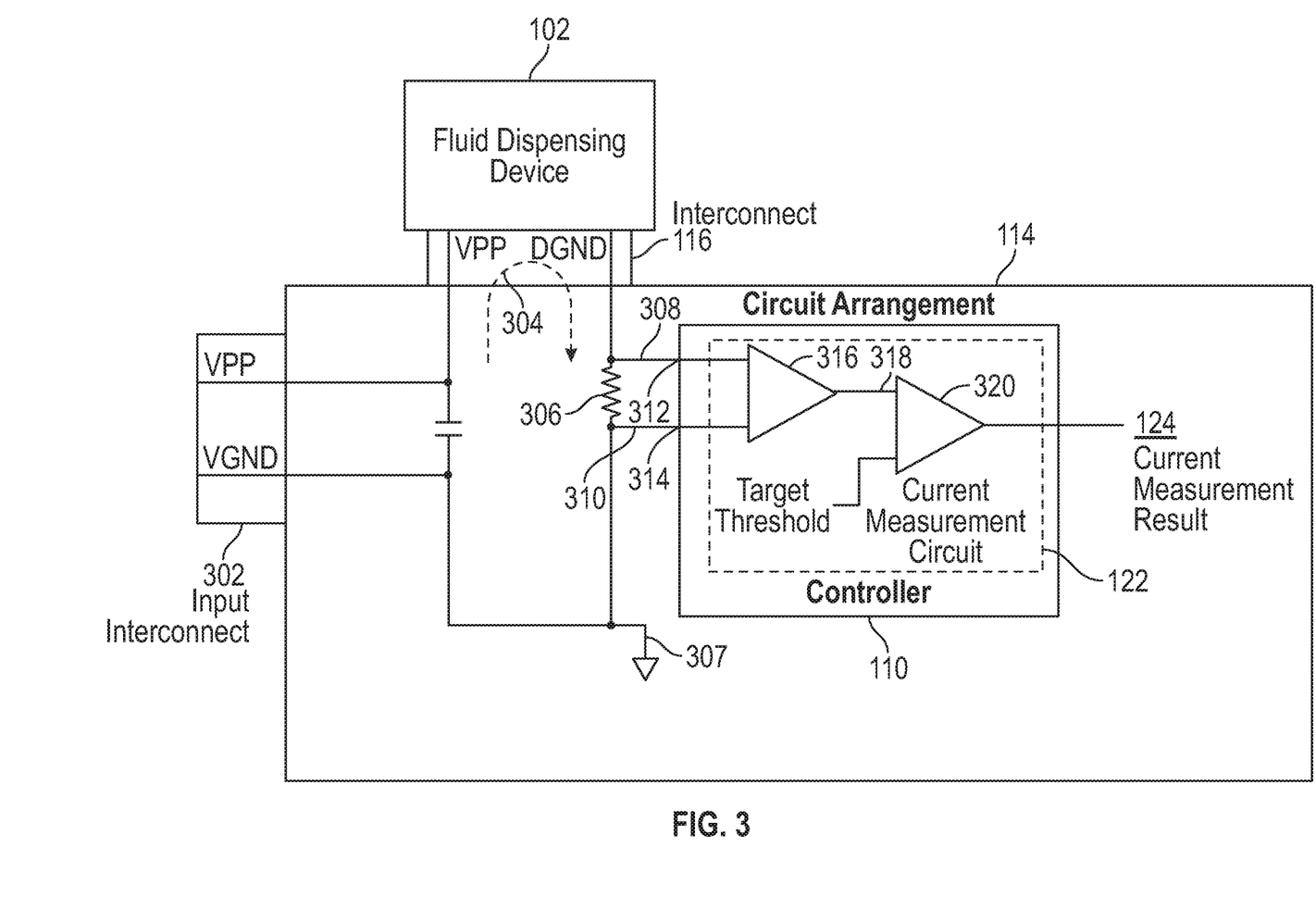
FIG. 3 is a schematic diagram of a circuit arrangement connected to a fluid dispensing device according to some examples.

FIG. 3 is a circuit diagram showing circuitry according to some examples of the present disclosure. As shown in FIG. 3, the electrical interconnect 116 that electrically couples the circuit arrangement 114 to the fluid dispensing device 102 includes power lines VPP and VGND, where VPP is an elevated power voltage and VGND is a second voltage lower than the power voltage (e.g., VGND is at ground). VPP is supplied by a power source (not shown) through an input interconnect 302 of the circuit arrangement 114. During operation of the flow dispensing device 102, activation of fluid actuators and other electrical components of the fluid dispensing device 102 draws electrical current from VPP, which flows through the fluid dispensing device 102 and out of a DGND output of the interconnect 116. This current flow is depicted by arrow 304 in FIG. 3.

As further shown in FIG. 3, a current sense resistor 306 is connected to DGND. The current sense resistor 306 is an example of the electrical current sensor 118 of FIG. 1. The current sense resistor 306 is connected between DGND and a return ground 307 of the circuit arrangement 114.

Nodes 308 and 310 are connected to the two different ends of the current sense resistor 306. The nodes 308 and 310 are Kelvin connected to high impedance input pins 312 and 314, respectively, of the controller 110. A Kelvin connection refers to a two-wire connection between the two ends of the current sensor resistor 306 and the input pins 312, 314 of the controller 110.

The controller 110 includes the current measurement circuit 122, which in some examples include a current sense amplifier 316 that has two inputs connected to the respective input pins 312 and 314. The current sense amplifier 316 generates a sense voltage 318 that is proportional to the voltage across the input pins 312 and 314, which is based on the voltage drop across the current sensor resistor 306 due to the electrical current 304 flowing through the current sense resistor 306. A comparator 320 compares the sense voltage 318 from the current sense amplifier 316 to a target threshold 322 (which as explained above can be set by the issue detector 126 or another circuit based on the measurable events).

The comparator 320 outputs a first value in response to the sense voltage 318 exceeding the target threshold 322, and outputs a different second value in response to the sense voltage 318 not exceeding the target threshold 322.

In examples described in connection with FIGS. 1-3, reference is made to detecting an issue of the fluid dispensing device 102 that is part of the fluid dispensing system 100. In other examples, techniques or mechanisms according to some implementations of the present disclosure can be applied to detect issues of types of devices deployed in different types of systems. For example, instead of a fluid dispensing device 102, a different device can include a switch device, a servo control device, and so forth.

A switch device can be used to perform hot-swapping, for example, of an electronic device. Hot-swapping can refer to inserting an electronic device into a system while the system is powered on and operational, or removing the electronic device from the system while the system is powered on and operational. The switch device can be used to perform the connection or disconnection of the electronic device during a hot-add process or a hot-remove process. The switch device can be controlled by a control signal, which can be an example of the control data 128 produced by the control data generator 132 in FIG. 1. The control signal can be used to control when the switch device is on or off. The control signal can be used to predict, such as by an issue detector similar to the issue detector 126, when an in-rush of electrical current is expected responsive to the switching of the switch device. Similarly, a prediction can be made based on the control signal of when the electrical current is expected to drop suddenly due to the activation of the switch device, such as for removing an electronic device.

In a different example, a servo control device can be used to control operation of a motor or other mechanical system. Control data can be provided to the servo control device, which can be used to control operation of the motor or other mechanical system. The control data provided to the servo control device can be used to predict the timing of load currents associated with operation of the motor or other mechanical system. The correlation between the predicted current load and the measured electrical current can be used to assess the health of the servo control device.

Figure 4:
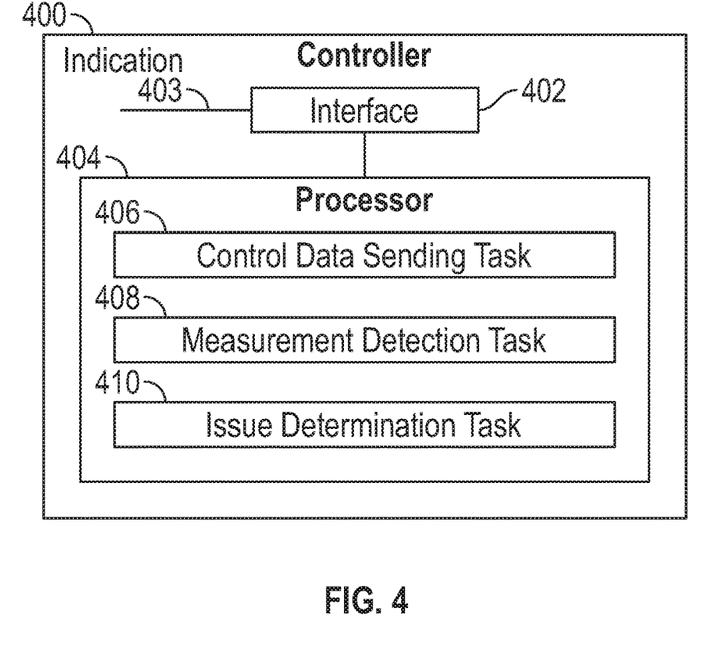
FIG. 4 is a block diagram of a controller according to some examples.

FIG. 4 is a block diagram of a controller 400 that includes an interface 402 to receive an indication 403 (e.g., the current indication 120 of FIG. 1) based on an electrical current through a device. The controller 400 can refer to one controller, or to multiple controllers (such as 110 and 130 in FIG. 1). The interface 402 can refer to any connection that allows for communication between the controller 400 and another component, such as the current sensor 118 of FIG. 1.

The controller 400 further includes a processor 404. A processor can include a microprocessor, a core of a multi-core microprocessor, a microcontroller, a programmable integrated circuit, a programmable gate array, a digital signal processor, or another hardware processing circuit, such as discrete components including timers, counters, state machines, latches, buffers, and so forth.

The processor 404 can perform various tasks. A processor performing a task can refer to a single processor performing the task or multiple processors performing the task. The tasks include a control data sending task 406 to send control data to the device to operate the device. If the device is a fluid dispensing device, the control data includes fire data to control activation of fluidic actuators of the fluid dispensing device.

The tasks further include a measurement detection task 408 to detect a measurement based on the indication that is responsive to an operation of the device according to the control data. The tasks further include an issue determination task 410 to determine whether an issue exists in the device responsive to determining whether the measurement satisfies an expected property based on the control data. The measurement satisfying the expected property based on the control data can include the measurement having a transition occurring within a target time window based on the control data. For example, the issue determination task 410 can determine, based on the control data for a measurable event, when the measurement is expected to be below a threshold and when the measurement is expected to be above the threshold. In such an example, the measurement satisfying the expected property based on the control data includes the measurement having a transition between a first value below the threshold and a second value above the threshold occurring within an expected time window based on the control data.

The measurement detection task 408 and the issue determination task 410 can be performed during operation of the device according to the control data.

Figure 5:
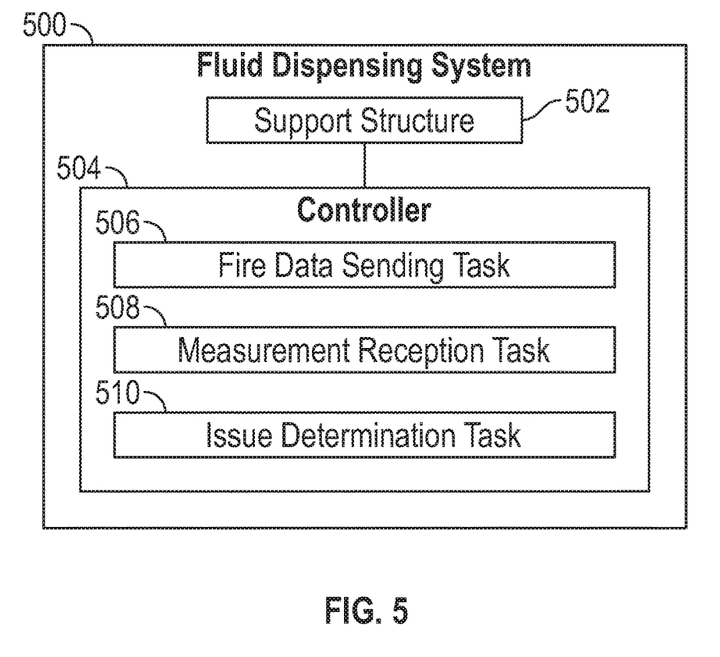
FIG. 5 is a block diagram of a fluid dispensing system according to further examples.

FIG. 5 is a block diagram of a fluid dispensing system 500 that includes a support structure 502 (e.g., the carriage 112 of FIG. 1) to receive a fluid dispensing device. The fluid dispensing system 500 further includes a controller 504 to perform various tasks. The tasks include a fire data sending task 506 to send fire data to a fluid dispensing device to operate fluidic actuators of the fluid dispensing device.

The tasks further include a measurement reception task 508 to receive a measurement based on an indication (e.g., the current indication 120) that is responsive to an operation of the fluid dispensing device according to the fire data. The tasks additionally include an issue determination task 510 to determine whether an issue exists in the fluid dispensing device responsive to determining whether the measurement satisfies an expected property based on the fire data.

Figure 6:
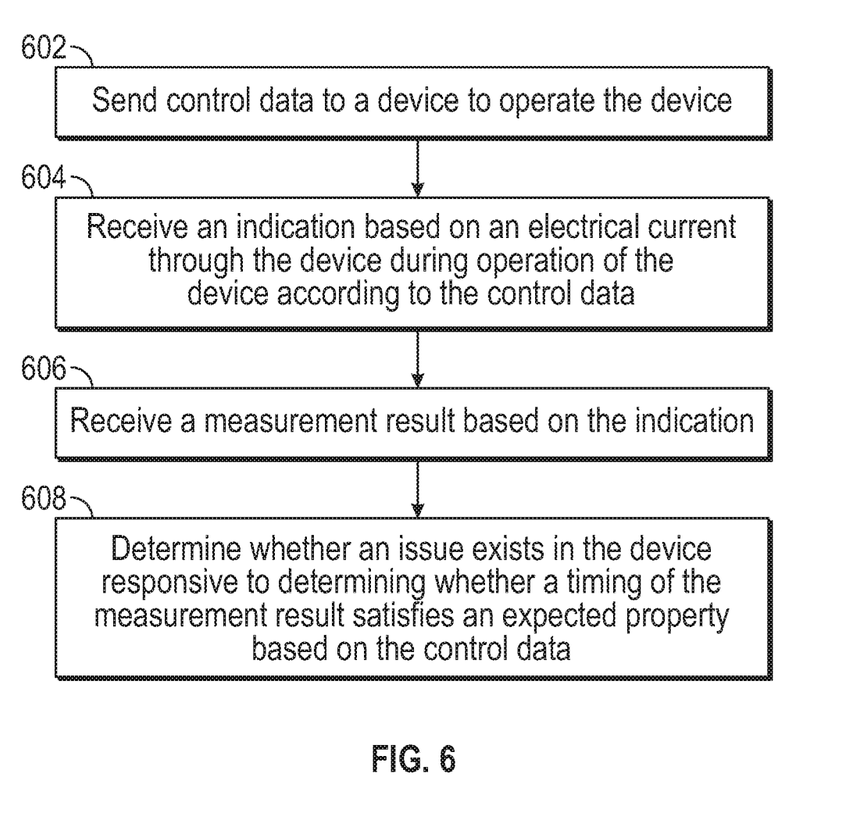
FIG. 6 is a flow diagram of a process performed by a controller according to some examples.

FIG. 6 is a flow diagram of a process that can be performed by a controller according to some examples. The process of FIG. 6 includes sending (at 602) control data to a device to operate the device, and receiving (at 604) an indication based on an electrical current through the device during operation of the device according to the control data. The process further includes receiving (at 606) a measurement result based on the indication, and determining (at 608) whether an issue exists in the device responsive to determining whether a timing of the measurement result satisfies an expected property based on the control data In some examples, some of the tasks discussed herein may be performed by machine-readable instructions stored in a non-transitory machine-readable or computer-readable storage medium. The storage medium can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A controller comprising:
an interface to receive an indication based on an electrical current through a device; and
a processor to:
send control data to the device to operate the device, the control data including an incremental increase in current to the device causing delays for supplying electrical current to portions of the device;
detect a measurement based on the indication that is responsive to an operation of the device according to the control data; and
determine whether an issue exists in the device responsive to determining whether the measurement satisfies an expected property based on the control data.

2. The controller of claim 1, wherein the measurement satisfying the expected property based on the control data comprises the measurement having a transition occurring within a target time window based on the control data.

3. The controller of claim 1, wherein the detecting of the measurement based on the indication and the determining are performed during the operation of the device based on the control data.

4. The controller of claim 1, wherein the indication is based on the electrical current flowing through a power line connected to the device.

5. The controller of claim 4, wherein the indication is based on the electrical current flowing through a sense resistor connected to the device.

6. The controller of claim 1, wherein the device comprises a fluid dispensing device, and the control data controls activation of fluidic actuators of the fluid dispensing device.

7. The controller of claim 6, wherein the processor is to:
determine, based on the control data for a measurable event, when the measurement is expected to be below a threshold and when the measurement is expected to be above the threshold,
wherein the measurement satisfying the expected property based on the control data comprises the measurement having a transition between a first value below the threshold and a second value above the threshold occurring within an expected time window based on the control data.

8. The controller of claim 6, wherein detecting of the measurement and the determining are performed during a fluid dispensing operation of the fluid dispensing device, to identify the issue occurring during the fluid dispensing operation.

9. A fluid dispensing system comprising:
a support structure to receive a fluid dispensing device; and
a controller to:
send fire data to a fluid dispensing device to operate fluidic actuators of the fluid dispensing device, the fire data including an incremental increase in current causing a delay in supplying electrical current to a portion of the fluidic actuators and a delay in activation of the portion of the fluidic actuators;
receive a measurement based on an indication that is responsive to an operation of the fluid dispensing device according to the fire data; and
determine whether an issue exists in the fluid dispensing device responsive to determining whether the measurement satisfies an expected property based on the fire data.

10. The fluid dispensing system of claim 9, further comprising the fluid dispensing device.

11. The fluid dispensing system of claim 9, wherein the indication is responsive to an electrical current flow through a sense resistor connected to the fluid dispensing device.

12. The fluid dispensing system of claim 9, wherein the controller is to determine whether the issue exists in the fluid dispensing device by determining whether a transition of the measurement between different values occurs within a target time window based on the fire data.

13. The fluid dispensing system of claim 12, wherein the different values comprise a first value below a threshold and a second value above the threshold.

14. A method performed by a controller, comprising:
sending control data to a device to operate the device, the control data including an incremental increase in current to the device causing delays for supplying electrical current to portions of the device;
receiving an indication based on an electrical current through the device during operation of the device according to the control data;
receiving a measurement result based on the indication; and
determining whether an issue exists in the device responsive to determining whether a timing of the measurement result satisfies an expected property based on the control data.

15. The method of claim 14, wherein the device is a fluid dispensing device, and wherein sending the control data comprises sending fire data to control fluidic actuators of the fluid dispensing device.

* * * * *